United States Patent
Yamauchi et al.

(10) Patent No.: US 8,986,514 B2
(45) Date of Patent: Mar. 24, 2015

(54) PHOTOREDUCTION CATALYST, AND METHOD FOR SYNTHESIZING AMMONIA AND METHOD FOR DECREASING NITROGEN OXIDES IN WATER USING THE SAME

(75) Inventors: Miho Yamauchi, Sapporo (JP); Ryu Abe, Sapporo (JP)

(73) Assignee: National University Corporation Hokkaido University, Hokkaido (JP)

( * ) Notice: Subject to any disclaimer, the term of this patent is extended or adjusted under 35 U.S.C. 154(b) by 263 days.

(21) Appl. No.: 13/393,833

(22) PCT Filed: Sep. 3, 2010

(86) PCT No.: PCT/JP2010/065157
§ 371 (c)(1),
(2), (4) Date: Jun. 6, 2012

(87) PCT Pub. No.: WO2011/027864
PCT Pub. Date: Mar. 10, 2011

(65) Prior Publication Data
US 2012/0228120 A1 Sep. 13, 2012

(30) Foreign Application Priority Data
Sep. 4, 2009 (JP) .................................. 2009-204556

(51) Int. Cl.
*B01J 19/12* (2006.01)
*C01B 21/00* (2006.01)
(Continued)

(52) U.S. Cl.
CPC ............ *B01J 35/004* (2013.01); *B01J 23/8926* (2013.01); *B01J 35/0013* (2013.01);
(Continued)

(58) Field of Classification Search
CPC .... B01J 35/004; B01J 23/8926; B01J 35/006; C01C 1/026; C02F 1/70; C02F 1/32; C02F 2101/163; C02F 2305/10
USPC .................................................... 204/157.46
See application file for complete search history.

(56) References Cited

U.S. PATENT DOCUMENTS 4,427,509 A * 1/1984 Lichtin ..................... 204/157.46
4,762,600 A * 8/1988 Khader et al. ............ 204/157.46
(Continued)

FOREIGN PATENT DOCUMENTS

CN 101385981 A 3/2009
JP 08-192149 7/1996
(Continued)

OTHER PUBLICATIONS

Rao et al, "Al-pillared clay supported CuPd catalyst for nitrate reduction," J. Porous Mater. (2007) vol. 14, pp. 205-212.*
(Continued)

*Primary Examiner* — Colleen M Raphael
(74) *Attorney, Agent, or Firm* — Ditthavong & Steiner, P.C.

(57) ABSTRACT

Disclosed are: a catalyst which is capable of reducing and converting nitrate ions into ammonia without adding a hydrogen gas thereto; a method for synthesizing ammonia using the catalyst, wherein nitrate ions are reduced without adding a hydrogen gas thereto; and a method for decreasing nitrogen oxide in water by reducing nitrate ions contained in the water. Disclosed is a photocatalyst composition that is obtained by loading a photocatalyst, which is capable of photoreducing protons into a hydrogen gas, with CuPd alloy nanoparticles. The photocatalyst composition is used for the purpose of producing ammonia by photoreducing nitrogen that is coexistent with water and nitrogen oxide. The CuPd alloy nanoparticles are (1) CuPd alloy nanoparticles having a B2 type crystal structure and represented by CuxPd(1-x) (wherein $0.3 \leq x \leq 0.7$), (2) CuPd alloy nanoparticles having a bcc type crystal structure and represented by CuxPd(1-x) (wherein $0.3 < x < 0.7$), (3) CuPd alloy nanoparticles having a fcc type crystal structure and represented by CuxPd(1-x) (wherein $0.01 \leq x \leq 0.99$), (4) CuPd alloy nanoparticles having an L12 type crystal structure and represented by CuxPd(1-x) (wherein $0.7 \leq x \leq 0.98$), or (5) CuPd alloy nanoparticles having a crystal structure wherein at least two of a B2 type portion, a bcc type portion, an fcc type portion, an L12 type portion and a phase separation type portion are mixed. Disclosed are a method for synthesizing ammonia using the photocatalyst composition, and a method for decreasing nitrogen oxide in water using the photocatalyst composition.

4 Claims, 8 Drawing Sheets

(51) Int. Cl.
  *B01J 35/00* (2006.01)
  *B01J 23/89* (2006.01)
  *C01C 1/02* (2006.01)
  *C02F 1/70* (2006.01)
  *C02F 1/32* (2006.01)
  *C02F 101/16* (2006.01)

(52) U.S. Cl.
  CPC .............. *B01J35/006* (2013.01); *C01C 1/026* (2013.01); *C02F 1/70* (2013.01); *C02F 1/32* (2013.01); *C02F 2101/163* (2013.01); *C02F 2305/10* (2013.01)
  USPC ................................................... 204/157.46

(56) References Cited

U.S. PATENT DOCUMENTS

| | | | | |
|---|---|---|---|---|
| 4,980,040 | A * | 12/1990 | Lichtin et al. | 204/157.46 |
| 7,894,202 | B2 * | 2/2011 | Fukudome et al. | 361/763 |
| 8,129,306 | B2 * | 3/2012 | Myers et al. | 502/326 |
| 2004/0072684 | A1 * | 4/2004 | Tsujimichi et al. | 502/242 |

FOREIGN PATENT DOCUMENTS

| | | |
|---|---|---|
| JP | 11-151445 | 6/1999 |
| JP | 2007-021289 | 2/2007 |
| JP | 2008-221037 | 9/2008 |

OTHER PUBLICATIONS

Hasnat et al, "Electrocatalytic ammonia synthesis: Role of cathode materials and reactor configuration," Catalyst Communications (2009) vol. 10 No. 15, pp. 1975-1979.*

Reyter et al, "Elaboration of Cu-Pd Films by Coelectrodeposition: Application to Nitrate Electroreduction," J. Phys. Chem. C (2009) vol. 113, No. 1, pp. 290-297.*

Ghodbane et al, "Electrochemical Reduction of Nitrate on Pyrolytic Graphite-Supported Cu and Pd-Cu Electrocatalysts," J. Electrochem. Soc. vol. 155, No. 6, pp. F117-F123 (2008).*

Szpyrkowicz, L. et al, "Removal of NO3- from water by electrochemical reduction in different reactor configurations," Applied Catalysis B: Environmental vol. 66, (2006) pp. 40-50.*

Szpyrkowicz et al, "Removal of NO3- from water by electrochemical reduction in different reactor configurations," Applied Catalysis B: Environmental vol. 66 (2006) pp. 40-50.*

Hungria et al, "Effects of Copper on the Catalytic Properties of Bimetallic Pd—Cu/(Ce,Zr)Ox/Al2O3 and Pd—Cu/(Ce,Zr)Ox Catalysts for CO and NO Elimination," J. of Catalysis vol. 206, pp. 281-294 (2002).*

Shimada et al., "De-toxifying by reduction of nitrate ion in water to nitrogen with metal supported titanium oxide photocatalyst", Dai 94 Kai Shokubai Toronkai-Toronkai A Yokoshu, 2004, p. 41 with the partial English translation.

Kominami et al., "Effective photocatalytic reduction of nitrate to ammonia in an aqueous suspension of metal-loaded titanium(IV) oxide particles in the presence of oxalic acid", Catalysis Letters, 2001, vol. 76, p. 31-34.

Yamauchi et al., "Hydrogen-Storage Properties of polymer-coated CuPd Nanoparticle", 85th Annual Meeting of Chemical Society of Japan, 2005, p. 385 with the partial English translation.

Kathryn et al., "Catalytic Nitrate and Nitrite Reduction with Pd-Cu/PVP Colloids in Water: Composition, Structure, and Reactivity Correlations", J. Phys. Chem., C, 2009, vol. 113, p. 8177-8185.

Wehbe et al., "Comparative study of photocatalytic and non-photocatalytic reduction of nitrates in water", Applied Catalysis A: General, 2009, vol. 368, No. 1-2, p. 1-8.

Fanning, "The chemical reduction of nitrate in aqueous solution", Coordination Chemistry Reviews, 199, pp. 159-179, (2000).

International Search Report for corresponding International Application No. PCT/JP2010/065157, Dec. 7, 2010.

International Preliminary Report on Patentability for corresponding International Application No. PCT/JP2010/065157, Mar. 29, 2012.

Extended European Search Report for corresponding European Application No. 10813811.6, dated Jul. 24, 2014, 8 pages.

Gao et al.,"Titania-Supported Bimetallic Catalysts for Photocatalytic Reduction of Nitrate", Catalysis Today, vol. 90, No. 3-4, dated Jul. 1, 2004, pp. 331-336.

* cited by examiner

Cu0.10Pd0.90 Nanoparticles

Mean particle diameter
2.8±0.5 nm

Cu0.20Pd0.80 Nanoparticles

Mean particle diameter
2.6±0.5 nm

Cu0.51Pd0.49 Nanoparticles

Mean particle diameter
2.2±0.7 nm

Cu0.59Pd0.41 Nanoparticles

Mean particle diameter
2.5±0.5 nm

PHOTOREDUCTION CATALYST, AND METHOD FOR SYNTHESIZING AMMONIA AND METHOD FOR DECREASING NITROGEN OXIDES IN WATER USING THE SAME

CROSS-REFERENCE TO RELATED APPLICATIONS

This application claims benefit of priority to Japanese Patent Application No. 2009-204556 filed on Sep. 4, 2009, which is expressly incorporated herein by reference in its entirety.

The present invention relates to a photoreduction catalyst employing CuPd alloy nanoparticles, a method for synthesizing ammonia using the same, and a method for decreasing nitrogen oxides in water using the same.

BACKGROUND ART

Ammonia Production

The current level of ammonia production worldwide is about 150 million tons. Nearly 80% of this is used as raw material for fertilizers, and the remaining 20% or so is used to manufacture synthetic resins and fibers. In particular, the nitrogen component of crops (protein in the human body) can only be supplied as ammonia. Ammonia is a substance that is indispensible as a starting material for chemical fertilizers. In response to global population growth, inadequate arable land, and a shortage of grain due to the increasingly sophisticated diets of emerging countries, the demand for ammonia is predicted to increase 3 to 4% or more annually. In particular, increased demand is a certainty in Africa, Central and South America, and Asia, which are threatened with grain crises. Thus, ammonia is positioned as a strategic resource in grain supply and demand.

There are also high hopes for ammonia as a carbon-free fuel and as a fuel in anionic fuel cells, a form of noble metal-free (platinum-free) fuel cell.

At first glance, ammonia was thought of as a clean fuel that did not contain carbon. However, the only industrial process currently in use is the Haber-Bosch process, invented nearly 100 years ago (a method of bonding nitrogen with hydrogen to make ammonia). The hydrogen is derived from natural gas. The economics of ammonia synthesis depend on being able to obtain hydrogen cheaply. That is, the ammonia that is currently being produced is nothing more than an alternative fossil compound obtained by investing a huge amount of energy to replace the carbon in fossil fuels with nitrogen. Its production entails the consumption of huge amounts of natural gas and the release of carbon dioxide, both of which are undesirable.

Accordingly, it is urgent that an alternative process to the Haber-Bosch process be developed to supply the nitrogen required by organisms in the future, when petroleum has been depleted. This has become an international issue.

In that regard, Patent Reference 1 discloses a photocatalytically active inorganic oxide semiconductor with markedly enhanced nitrogen fixing efficiency and an electrically conductive polymer contact composite material. The irradiation with light of a contact composite photocatalystic material, obtained by bringing an inorganic oxide semiconductor having a photocatalytic function into contact with an electrically conductive polymer that is soluble or dispersible in a solvent to form a composite, to cause nitrogen gas in the atmosphere to be fixed as ammonia salts and ammonia, is disclosed.

[Removing the Nitrate Ions in Water]

Nitrate ions are components that are suspected of contributing to the generation of carcinogenic substances in the form of nitrous acid and nitrosamines in the body. The uptake of nitrate ions is undesirable in terms of health. Thus, limits have been set for its concentration contained in drinking water.

Conventional methods of removing nitrate ions from water include the method of removing nitrate ions in water with adsorbents and the method of decomposing and removing nitrate ions with microorganisms. However, due to the fact that no processing technique has yet been established for the nitrate ions that are concentrated by adsorption in the former method, and due to technical limitations on the handling of microorganisms in the latter method, these conventional methods have yet to be put to practical use as a result of processing costs and difficulties presented by the processing techniques.

Accordingly, attempts have recently been made to reductively decompose the nitrate ions in the presence of a reducing agent using photocatalysts to overcome these problems (Patent References 2 and 3).

As methods of removing nitrate ions from water, effort has been made to use various reducing agents to reduce nitrate ions and eliminate them to obtain potable water. Various reducing agents have been examined (Nonpatent Reference 1). As a nitric acid reduction catalyst, CuPd is known to be a most useful alloy that is capable of reducing nitric acid in a hydrogen atmosphere (Nonpatent Reference 2).

PRIOR ART REFERENCES

Patent Reference

Patent Reference 1: Japanese Unexamined Patent Publication (KOKAI) No. 2008-221037
Patent Reference 2: Japanese Unexamined Patent Publication (KOKAI) Heisei No. 8-192149
Patent Reference 3: Japanese Unexamined Patent Publication (KOKAI) Heisei No. 11-151445

Nonpatent Reference

Nonpatent Reference 1: Coordination Chemistry Reviews, 199, 159-179 (2000)
Nonpatent Reference 2: J. Phys. Chem. C, 113, 8177-8185 (2009)
Patent References 1 to 3 and Nonpatent References 1 and 2 are expressly incorporated herein by reference in their entirety.

SUMMARY OF THE INVENTION

Problem to be Solved by the Invention

However, when using the CuPd alloy catalyst described in Nonpatent Reference 2 to reduce nitrate ions, it is necessary to introduce hydrogen. Further, the conversion rate from nitrate ions to ammonia is low (Nonpatent Reference 2 and the case of no light radiation in Embodiment (2) (fcc-CuPd—$TiO_2$ and B2-CuPd—$TiO_2$)).

Accordingly, one object of the present invention is to provide a catalyst that is capable of reducing nitrate ions and converting them to ammonia without adding hydrogen gas. A further object of the present invention is to provide a method for synthesizing ammonia using this catalyst to reduce nitrate ions and synthesize ammonia without adding hydrogen gas. A still further object of the present invention is to provide a method for decreasing nitrogen oxides such as nitrate ions in water by using this catalyst to reduce the nitrate ions contained in water such as potable and sewage waters.

Means of Solving the Problems

The present inventors discovered that a CuPd alloy nanoparticle-supported photocatalyst in which a CuPd alloy nanoparticle having a prescribed crystalline structure and particle diameter is combined with a photocatalyst was capable of producing ammonia from nitrogen and nitrogen oxides in water without the addition of hydrogen gas, and that the nitrogen oxides in water could be reduced as ammonia. The present invention was devised on that basis.

The present invention is as set forth below:

[1]
A photocatalyst composition, in which CuPd alloy nanoparticles are supported on a photocatalyst capable of photoreducing protons to hydrogen, that photoreduces at least one member selected from the group consisting of nitrogen oxides and nitrogen present in water to produce ammonia.

[2]
The photocatalyst composition according to [1], wherein the CuPd alloy nanoparticles comprise an ordered alloy or a disordered alloy.

[3]
The photocatalyst composition according to [1], wherein the CuPd alloy nanoparticles are at least one type of CuPd alloy nanoparticle from among (1) to (5) below:
(1) CuPd alloy nanoparticles having a B2 type crystal structure and denoted by $Cu_xPd_{(1-x)}$ (wherein $0.3<x<0.7$);
(2) CuPd alloy nanoparticles having a bcc type crystal structure and denoted by $Cu_xPd_{(1-x)}$ (wherein $0.3<x<0.7$);
(3) CuPd alloy nanoparticles having an fcc type crystal structure and denoted by $Cu_xPd_{(1-x)}$ (wherein $0.01 \leq x \leq 0.99$);
(4) CuPd alloy nanoparticles having an $L1_2$ type crystal structure and denoted by $Cu_xPd_{(1-x)}$ (wherein $0.7 \leq x \leq 0.98$); and
(5) CuPd alloy nanoparticles having a crystal structure in which at least two from among a B2 type crystal portion, a bcc type portion, an fcc type portion, an $L1_2$ type portion, and a phase separation portion are mixed.

[4]
The photocatalyst composition according to any one of [1] to [3], wherein the photocatalyst that is capable of photoreducing protons to hydrogen is comprised of a semiconductor having a band gap of 1.23 V or higher.

[5]
The photocatalyst composition according to [4], wherein the semiconductor is a metal oxide ($TiO_2$, $SrTiO_3$, NaON, ZnO, NiO, $Cu_2O$), a metal sulfide (ZnS, CdS, HgS), a metal selenide (CdSe), or a derivative thereof.

[6]
The photocatalyst composition according to any one of [1] to [5], wherein the reaction producing ammonia by photoreducing at least one member selected from the group consisting of nitrogen and nitrogen oxides is implemented without adding hydrogen gas to the reaction system from outside the reaction system.

[7]
The photocatalyst composition of any one of [1] to [6], wherein the particle diameter of the CuPd alloy nanoparticles falls within a range of 1 to 200 nm.

[8]
A method for producing ammonia, comprising reducing at least one member selected from the group consisting of nitrogen and nitrogen oxides in water in the presence of a photocatalyst composition in which CuPd alloy nanoparticles are supported on a photocatalyst capable of photoreducing protons to hydrogen with irradiation of the photocatalyst composition with light capable of activating the photocatalyst contained in the photocatalyst composition to produce ammonia.

[9]
The method for producing ammonia according to [8], wherein the CuPd alloy nanoparticles comprise an ordered alloy or a disordered alloy.

[10]
The production method according to [8] or [9], wherein the CuPd alloy nanoparticles are at least one type of CuPd alloy nanoparticle from among (1) to (5) below:
(1) CuPd alloy nanoparticles having a B2 type crystal structure and denoted by $Cu_xPd_{(1-x)}$ (wherein $0.3<x<0.7$);
(2) CuPd alloy nanoparticles having a bcc type crystal structure and denoted by $Cu_xPd_{(1-x)}$ (wherein $0.3<x<0.7$);
(3) CuPd alloy nanoparticles having an fcc type crystal structure and denoted by $Cu_xPd_{(1-x)}$ (wherein $0.01 \leq x \leq 0.99$);
(4) CuPd alloy nanoparticles having an $L1_2$ type crystal structure and denoted by $Cu_xPd_{(1-x)}$ (wherein $0.7 \leq x \leq 0.98$); and
(5) CuPd alloy nanoparticles having a crystal structure in which at least two from among a B2 type crystal portion, a bcc type portion, an fcc type portion, an $L1_2$ type portion, and a phase separation portion are mixed.

[11]
A method for reducing nitrogen oxides in water, comprising reducing nitrogen oxides to produce ammonia in water containing at least one type of nitrogen oxides in the presence of a photocatalyst composition in which CuPd alloy nanoparticles are supported on a photocatalyst capable of photoreducing protons to hydrogen with irradiation of the photocatalyst composition with light capable of activating the photocatalyst contained in the photocatalyst composition.

[12]
The method according to [11], wherein the CuPd alloy nanoparticles have an ordered solid solution type structure or a disordered solid solution type structure.

[13]
The method according to [11] or [12], wherein the CuPd alloy nanoparticles are at least one type of CuPd alloy nanoparticle from among (1) to (5) below:
(1) CuPd alloy nanoparticles having a B2 type crystal structure and denoted by $Cu_xPd_{(1-x)}$ (wherein $0.3<x<0.7$);
(2) CuPd alloy nanoparticles having a bcc type crystal structure and denoted by $Cu_xPd_{(1-x)}$ (wherein $0.3<x<0.7$);
(3) CuPd alloy nanoparticles having an fcc type crystal structure and denoted by $Cu_xPd_{(1-x)}$ (wherein $0.01 \leq x \leq 0.99$);
(4) CuPd alloy nanoparticles having an $L1_2$ type crystal structure and denoted by $Cu_xPd_{(1-x)}$ (wherein $0.7 \leq x \leq 0.98$); and
(5) CuPd alloy nanoparticles having a crystal structure in which at least two from among a B2 type crystal portion, a bcc type portion, an fcc type portion, an $L1_2$ type portion, and a phase separation portion are mixed.

[14]
The method according to any one of [7] to [13], wherein the particle diameter of the CuPd alloy nanoparticles falls within a range of 1 to 200 nm.

[15]
The method according to any one of [7] to [14], wherein the reduction reaction is implemented without adding hydrogen gas to the reaction system from outside the reaction system.

Effects of the Invention

The present invention makes it possible to efficiently produce ammonia from nitrogen or nitrogen oxides using a CuPd alloy nanoparticle-loaded photocatalyst without adding hydrogen gas by a process requiring a smaller quantity of CuPd alloy than in conventional methods.

The present invention provides a clean method for synthesizing ammonia, suited to a low-carbon and energy efficient society, that employs water as a source of hydrogen and synthesizes ammonia from nitrate ions and hydrogen produced using light energy.

Using the CuPd alloy nanoparticle-supporting photocatalyst of the present invention, it is possible to provide a new method for removing nitrate ions from water containing nitrate ions.

MODES OF CARRYING OUT THE INVENTION

The Photocatalyst Composition

Figure 1:
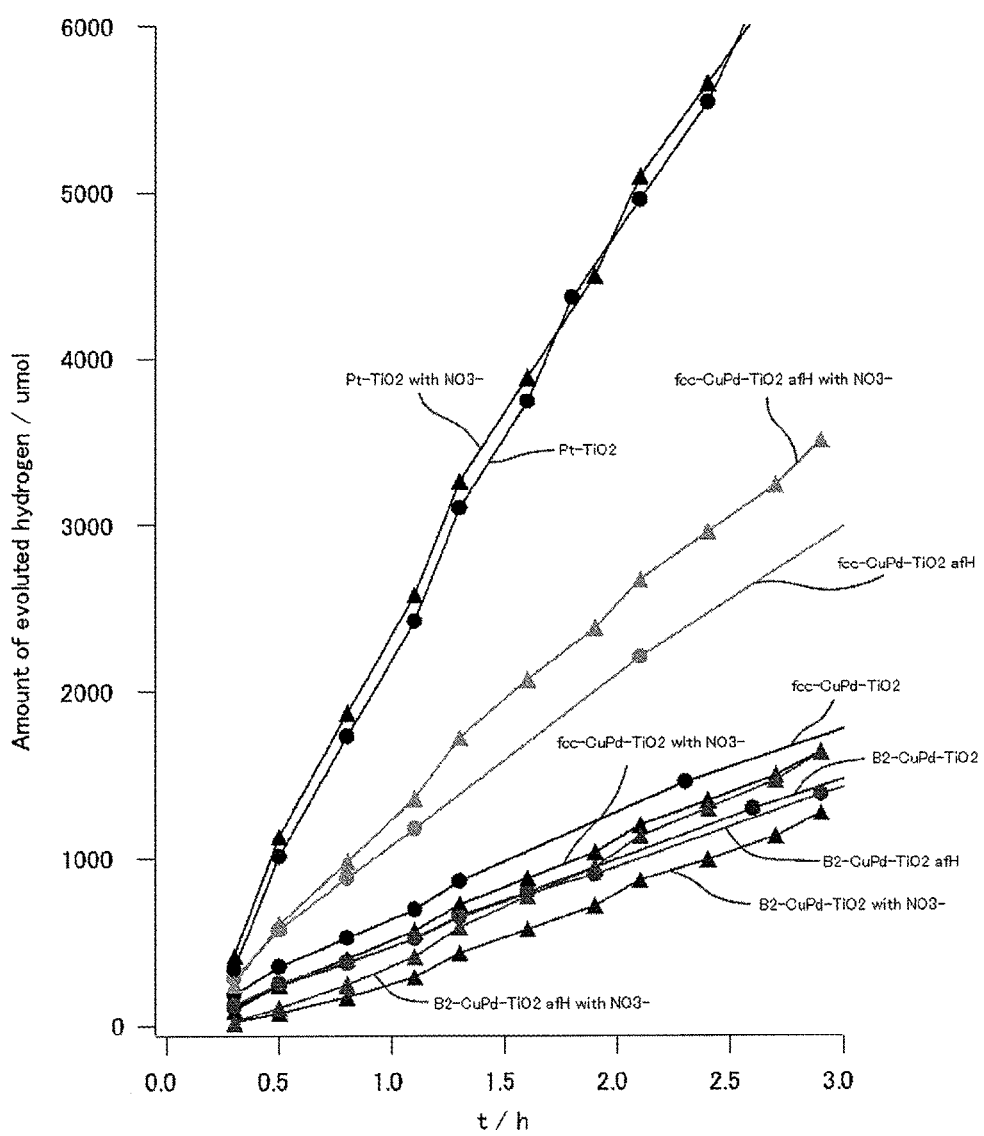
FIG. 1 shows the quantity of hydrogen produced in water-decomposing photoreactions employing variously loaded catalysts in Embodiment 1.

The photocatalyst composition of the present invention comprises at least one type of CuPd alloy nanoparticle from among (1) to (5) below loaded on a photocatalyst capable of photoreducing protons to hydrogen.

<The CuPd Alloy Nanoparticles>

The CuPd alloy nanoparticles employed in the photocatalyst composition of the present invention can be alloy nanoparticles comprising an ordered alloy or a disordered alloy. Generally, alloys can be classified based on structure into: (1) phase separation types, (2) disordered alloys (also called solid solution types), and (3) ordered alloys (also called intermetallic compounds). The CuPd alloy nanoparticles of the present invention can be of the phase separation type, but from the perspective of achieving high catalytic activity, are desirably disordered alloys or ordered alloys. It is also possible for them to contain a disordered alloy or an ordered alloy, with the remainder being a phase separation type alloy. For example, the CuPd alloy nanoparticles of the present invention can be a mixed alloy of a disordered alloy and a phase separation type alloy, a mixed alloy of an ordered alloy and a phase separation type alloy, or a mixed alloy of a disordered alloy, an ordered alloy, and a phase separation type alloy. More specifically, the CuPd alloy nanoparticles of the present invention can be at least one type of CuPd alloy nanoparticle selected from among (1) to (5) below:

(1) CuPd alloy nanoparticles having a B2 type crystal structure and denoted by $Cu_xPd_{(1-x)}$ (wherein 0.3<x<0.7);
(2) CuPd alloy nanoparticles having a bcc type crystal structure and denoted by $Cu_xPd_{(1-x)}$ (wherein 0.3<x<0.7);
(3) CuPd alloy nanoparticles having an fcc type crystal structure and denoted by $Cu_xPd_{(1-x)}$ (wherein 0.01≤x≤0.99);
(4) CuPd alloy nanoparticles having an $L1_2$ type crystal structure and denoted by $Cu_xPd_{(1-x)}$ (wherein 0.7≤x≤0.98); and
(5) CuPd alloy nanoparticles having a crystal structure in which at least two from among a B2 type crystal portion, a bcc type portion, an fcc type portion, an $L1_2$ type portion, and a phase separation portion are mixed.

The Cupd Alloy Nanoparticles of (1)

The CuPd alloy nanoparticles of (1) have a crystal structure of the B2 type. The B2 type crystal structure is based on a body-centered cubic structure in which the eight vertices of the cube are comprised of Cu and Pd is disposed at the body center position. However, in the crystal structure, the Cu and Pd are interchangeable. Further, depending on the composition, one of the metal positions can be replaced with the other metal. The CuPd alloy nanoparticles of (1) are classified as an ordered alloy. The CuPd alloy nanoparticles of (1) are denoted by $Cu_xPd_{(1-x)}$, with 0.3<x<0.7. When x is 0.3 or lower, the structure becomes the disordered fcc type, and when 0.7 or greater, it becomes the $L1_2$ or disordered fcc type. From the perspective of facilitating a B2 type crystal structure, x is such that 0.4<x<0.6. The CuPd alloy nanoparticles of (1) work efficiently to reduce $NO_3^-$ to $NO_2^-$ in the synthesis of ammonia from nitrate ions, and are of highly exploitable value.

The CuPd Alloy Nanoparticles of (2)

The CuPd alloy nanoparticles of (2) have a crystal structure of the bcc type. The bcc type crystal structure is based on a body-centered cubic structure in which the Cu and Pd constituting the eight vertices of the cube are arranged in disordered fashion. The CuPd alloy nanoparticles of (2) are classified as a disordered alloy. The CuPd alloy nanoparticles of (2) are denoted by $Cu_xPd_{(1-x)}$, with 0.3<x<0.7. When x is 0.3 or lower, the structure becomes the disordered fcc type, and when 0.7 or greater, it becomes the $L1_2$ or disordered fcc type. From the perspective of facilitating a bcc type crystal structure, x is such that 0.4<x<0.6. The CuPd alloy nanoparticles of (2) work efficiently to reduce $NO_3^-$ to $NO_2^-$ in the synthesis of ammonia from nitrate ions, and are of highly exploitable value.

the CuPd Alloy Nanoparticles of (3)

The CuPd alloy nanoparticles of (3) have a crystal structure of the disordered fcc type. The disordered fcc type crystal structure is a structure in which the constituent elements are disposed in disordered fashion at the lattice points of a face-centered cube. The CuPd alloy nanoparticles of (3) are classified as a disordered alloy. The CuPd alloy nanoparticles of (3) are denoted by $Cu_xPd_{(1-x)}$, with 0.01≤x≤0.99. The x in the $Cu_xPd_{(1-x)}$ of the CuPd alloy nanoparticles of (3) overlaps with the B2 type and the $L1_2$ type, but the crystal structure can be suitably selected based on the manufacturing conditions. The manufacturing conditions will be described further below. The resistance of CuPd alloy nanoparticles of the disordered fcc type to carbon monoxide poisoning is weaker than that of CuPd alloy nanoparticles of the B2 type and $L1_2$ type, but they have a unique adsorption property to nitrogen oxides not found in CuPd alloy nanoparticles of the B2 type and L1$_2$ type and are of highly exploitable value. The CuPd alloy nanoparticles of (3) work efficiently to produce ammonia from NO$_2^-$ in the synthesis of ammonia from nitrate ions, and are of highly exploitable value.

The CuPd Alloy Nanoparticles of (4)

The CuPd alloy nanoparticles of (4) have a crystal structure of the L1$_2$ type. The L1$_2$ type crystal structure is based on a face-centered cubic structure, and is a structure with Pd at the eight vertices of the cube and Cu disposed in the center of the face. However, depending on the composition, one metal occupying a given position can be replaced with the other metal. The CuPd alloy nanoparticles of (4) are classified as an ordered alloy. The CuPd alloy nanoparticles of (4) are denoted by Cu$_x$Pd$_{(1-x)}$, with $0.7 \leq x \leq 0.98$. When x exceeds 0.98, the structure becomes a disordered fcc structure, and when x is less than 0.7, as set forth above, it becomes a B2 type crystal structure. The CuPd alloy nanoparticles of (4) work efficiently to reduce NO$_3^-$ to NO$_2^-$ in the synthesis of ammonia from nitrate ions, and are of highly exploitable value.

The CuPd alloy nanoparticles of (5) are CuPd alloy nanoparticles having a crystal structure in which B2 type, L1$_2$ type, fcc type, and bcc type portions are mixed, or are an alloy in which a phase separation type alloy is further mixed with the above. Accordingly, the CuPd alloy nanoparticles of (5) are either a mixture of ordered alloys and disordered alloys, a mixture of ordered alloys and phase separation-type alloys, a mixture of disordered alloys and phase separation-type alloys, or a mixture of ordered alloys, disordered alloys, and phase separation-type alloys. Among these particles, the CuPd alloy nanoparticles in which a B2 type portion and an fcc type or bcc type portion are mixed in the crystal structure are denoted by Cu$_x$Pd$_{(1-x)}$ with $0.3 < x < 0.7$. However, some of the particles are of the B2 type and some are of the disordered fcc type or bcc type. The CuPd alloy nanoparticles in which an L1$_2$ type portion and an fcc type portion are mixed in the crystal structure are denoted by Cu$_x$Pd$_{(1-x)}$, with $0.7 \leq x \leq 0.98$. However, some of the particles are of the L1$_2$ type and some are of the disordered fcc type. The method and conditions of preparing mixed type CuPd alloy nanoparticles will be described further below. The mixing ratio in the crystal structure of the B2 type or L1$_2$ type portion and an fcc type or bcc type portion in the CuPd alloy nanoparticles of (5) can be suitably determined based on the reaction employed. For example, the ratio of the total volume accounted for by the volume of the portion having an fcc or a bcc type structure can fall within a range of 1 to 99%, desirably within a range of 10 to 80%. When a phase separation type alloy is contained, the ratio of the total volume accounted for by the volume of the phase separation type alloy can be 50% or less, desirably 30% or less, and preferably, falls within a range of 10%. The CuPd alloy nanoparticles of (5) work efficiently to produce ammonia from NO$_3^-$ in the synthesis of ammonia from nitrate ions and inhibit the production of NO$_2^-$, and are thus of highly exploitable value.

The CuPd alloy nanoparticles of (1) and (4) above are CuPd alloy nanoparticles with crystal structures of enhanced order (ordered alloys). Specifically, the degree of order denoted by equation (A) below is 95% or greater. The degree of order is desirably 99.0% or greater, preferably 99.5% or greater, and most preferably, 100%.

$$(1-(m-M)/M) \times 100\% \qquad (A)$$

m: The lattice constant of the CuPd alloy nanoparticles
M: The lattice constant of bulk in which Cu atoms and Pd atoms are orderly disposed.

The lattice constant of bulk in which Cu atoms and Pd atoms are orderly disposed, M, serving as a source for calculating the degree of order, can be experimentally obtained by powder or single crystal X-ray diffraction or the like. Alternatively, an estimated value L can be calculated for M based on the metallic bond radii of Cu atoms and Pd atoms, indicated in Chemical Handbooks and the like. The crystal structure and lattice constant m of CuPd alloy nanoparticles can be obtained by conducting powder X-ray diffraction and analyzing the diffraction pattern obtained.

For example, the estimated value L of the lattice constant at room temperature of a B2 type A$_x$B$_{(1-x)}$ alloy ($0.3 < x < 0.7$) is estimated from the metal bond radii of A and B (see Chemical Handbook, 5th Ed. Revised, Basic Chapter II, p. 887). Denoting the metal bond radii of A and B as a and b, respectively, it is denoted roughly as follows:

$$L = 2 \times (a \times x + b \times (1-x))/\sqrt{3}$$

The lattice constant m of B2 type A$_x$B$_{(1-x)}$ alloy nanoparticles that have just been prepared is greater than the lattice constant M (M being equal to the estimated value L calculated from the above equation) of bulk in which A atoms and B atoms are orderly disposed. As set forth below, a hydrogen atmosphere exposure treatment increases the interaction between metal atoms, and can be used to cause the lattice constant of the A$_x$B$_{(1-x)}$ alloy nanoparticles to drop below m and become about the same as M.

In Embodiment 2, the degree of order of Cu$_{0.5}$Pd$_{0.5}$ nanoparticles that had just been synthesized was $(143.036-2.99)/2.99 \times 100 = 98.5\%$. However, it was possible to achieve 100% by a hydrogen atmosphere exposure treatment.

The lattice constant of the CuPd alloy nanoparticles can be obtained by analyzing the powder X-ray diffraction pattern by the Rietveld method or the like.

From the perspective of achieving high catalytic activity, the average particle diameter of the CuPd alloy nanoparticles of (1) to (5) that are employed in the present invention is desirably 1 to 200 nm, preferably 1 to 100 nm, more preferably 1 to 20 nm, still more preferably 1 to 10 nm, yet more preferably falls within a range of 1 to 5 nm, and yet still more preferably, falls within a range of 1 to 4 nm. The smaller the average particle diameter of the CuPd alloy nanoparticles, the greater their activity tends to be when employed as catalysts, which is desirable. Accordingly, the smaller the average particle diameter of the CuPd alloy nanoparticles, the better. As described in the embodiments, the average particle diameter of the CuPd alloy nanoparticles in the present invention is a value estimated based on 200 random particles in a photograph obtained by observing the particles with a transmission electron microscope (such as a JEM-2000FX).

<The Method of Producing CuPd Alloy Nanoparticles>

By way of example, the method of producing CuPd alloy nanoparticles can comprise:

the step of preparing a dispersion or solution of Cu ions and Pd ions in the presence of a protective polymer in water or an aqueous solution; and the step of preparing CuPd alloy nanoparticles by adding a Cu ion and Pd ion reducing agent to the dispersion or solution obtained to reduce the Cu ions and Pd ions.

(The Step of Preparing the Dispersion or Solution)

A copper-containing compound can be employed as a source of Cu ions; a compound with good solubility in water or aqueous solutions is suitable. Examples of such compounds are copper acetate, copper chloride, copper sulfate, copper nitrate, hydrates thereof, and other inorganic copper-containing compounds. Copper-containing complexes are further examples.

Palladium-containing compounds can be employed as a source of Pd ions; a compound with good solubility in water or aqueous solutions is suitable. Examples of such compounds are palladium acetate, palladium chloride, palladium nitrate, hydrates thereof, and other inorganic palladium-containing compounds. Palladium-containing complexes are further examples.

The protective polymer is desirably a water-soluble polymer. Specifically, a polymer having a cyclic amide structure, such as PVP, is suitable. However, this is not a limitation. Based on the type of the alloy particle that is to be protected and the like, it is possible to employ polyvinyl alcohol, polyvinyl ethers, polyacrylates, poly(mercaptomethylenestyrene-N-vinyl-2-pyrrolidone), and polyacrylonitrile.

The roles of the protective polymer are mainly to prevent aggregation of the alloy particles produced in the subsequent reducing step and to control the size of the alloy particles produced. The CuPd alloy nanoparticles have an average particle diameter of 1 to 200 nm, preferably 1 to 100 m, more preferably 1 to 20 nm, still more preferably 1 to 10 nm, yet more preferably 1 to 7 nm, and optimally, an average particle diameter falling within a range of 1 to 4 nm. To maintain this particle diameter, it is desirable to use various means of protection against aggregation and the like of the nanoparticles. The protective polymer is employed as such a means. Further, the diameter of the alloy particles can be controlled by adjusting the ratio of metal and protective polymer. For example, when the relative quantity of the protective polymer is increased in the solution, the diameter of the alloy particles that precipitate decreases. Utilizing this phenomenon, it is possible to control the diameter of the alloy particles. The diameter of the precipitating alloy particles can also be adjusted by adjusting the concentration of the metal-containing compounds (such as salts) that are serving as sources of Cu ions and Pd ions.

In the preparation of the dispersion or solution, water or an aqueous solvent can be employed as the solvent. The aqueous solution can be a mixed solvent of water and an organic solvent with affinity for water. The organic solvent that is employed in the mixed solvent can be suitably selected based on the type of organic molecule and the like. For example, propanol, ethylene glycol, glycerol, and other polyhydric alcohols can be employed. When employing a mixed solvent of water and an organic solvent, the type of organic solvent and the mixing ratio of organic solvent and water can be suitably adjusted taking into account the solubility of the metal starting materials and the protective agent.

The dispersion or solution can be prepared by adding the protective polymer, Cu ion source, and Pd ion source to the above solvent, and dissolving or dispersing them. The order in which the protective polymer, Cu ion source, and Pd ion source are added is not limited. A solution in which the protective polymer has been dispersed or dissolved, a solution in which the Cu ion source has been dissolved, and a solution in which the Pd ion source has been dissolved can be suitably mixed to prepare the dispersion or solution.

By way of example, the concentration of the protective polymer can fall within a range of $1\times10^{-4}$ to 5 mass %, the concentration of Cu ions can fall within a range of $3\times10^{-7}$ to $5\times10^{-1}$ mass %, and the concentration of Pd ions can fall within a range of $3\times10^{-7}$ to $5\times10^{-1}$ mass % in the dispersion or solution.

(The Reducing Step)

Reducing agents for the Cu ions and Pd ions are added to the dispersion or solution obtained in the above step. From the perspective of the strong power to reduce Cu ions and Pd ions to metals, it is appropriate to employ compounds with standard reduction potentials that are on the negative side of hydrogen (0 eV) at room temperature. Examples of such reducing agents are $MBH_4$, $MEt_3BH$ (M=Na, K), sodium cyanoborohydride $NaBHEt_3$, lithium borohydride $LiBH_4$, lithium triethylborohydride $LiBHEt_3$, borane complex $BH_3.L$, triethylenesilane $Et_3SiH$, and sodium bis(2-methoxyethoxy)aluminum hydride (Red-Al). However, care must be exercised in that some of these reducing agents cannot be employed in aqueous solutions because of the risk of an explosive reaction with water. In such cases, it is suitable to employ a solvent other than water (such as an aprotonic polar solvent such as tetrahydrofuran, N,N-dimethylformamide, or dimethyl sulfoxide).

The quantity of reducing agent employed is suitably determined by taking into account the quantity of Cu and the like contained in the metal starting material. For example, it can be determined within a range of from an equivalent quantity to a quantity of 50 times the combined quantity of Cu ions and Pd ions to be reduced.

CuPd alloy metal nanoparticles are prepared by reducing the Cu ions and Pd ions with the reducing agent. The reduction temperature is determined taking into account the crystal structure of the alloy to be prepared by reduction; a temperature falling within a range of 0 to 110° C. is suitable, for example. The relation between the crystal structure of the alloy and the reduction temperature will be described further below.

When preparing the CuPd alloy nanoparticles with a B2 type crystal structure of (1), the molar ratio of Cu ions and Pd ions in the dispersion or solution ranges from greater than 0.3: less than 0.7 to less than 0.7: greater than 0.3 and the reduction temperature is 10° C. or greater. When reduction is conducted under these conditions, it is possible to prepare CuPd alloy nanoparticles with a crystal structure of the B2 type denoted by $Cu_xPd_{(1-x)}$. Alloys with ordered structures have a tendency hard to form that increases as the reduction temperature decreases. Thus, a reduction temperature of 10° C. or higher, desirably 20° C. or higher, and preferably, 30° C. or higher is employed. The upper limit of the reduction temperature is, for example, 100° C., desirably 80° C. The value of x changes with the size of the nanoparticles. Small nanoparticles can be obtained by increasing the quantity of protective polymer, decreasing the quantity of reducing agent, or both.

When preparing the CuPd alloy nanoparticles with an $L1_2$ type crystal structure of (4), employing a molar ratio of Cu ions and Pd ions in the dispersion or solution ranging from 0.7:0.3 to 0.98:0.02 and a reduction temperature of 10° C. or greater makes it possible to prepare CuPd alloy nanoparticles with a crystal structure of the $L1_2$ type denoted by $Cu_xPd_{(1-x)}$. Alloys with ordered structures have a tendency hard to form that increases as the reduction temperature decreases. Thus, a reduction temperature of 10° C. or higher, desirably 20° C. or higher, and preferably, 30° C. or higher is employed. The upper limit of the reduction temperature is, for example, 100° C., desirably 80° C.

When preparing the CuPd alloy nanoparticles with a B2 type crystal structure of (1) and the CuPd alloy nanoparticles with an $L1_2$ type crystal structure of (4), the reducing agent is desirably a hydrogen-containing compound. The compounds given above as examples of compounds having standard reduction potentials to the negative side of hydrogen (0 eV) at room temperature are all hydrogen-containing compounds. When employing a hydrogen-containing compound as a reducing agent in the reduction step, the hydrogen atoms enter the voids between the metal atoms, weakening the intermetallic bonds and promoting rearrangement of the metal atoms. They also have a tendency to stabilize ordered structures. The use of hydrogen-containing compounds as reducing agents further affords the advantage of facilitating a rise in the ordered property during exposure to a hydrogen atmosphere described further below. The use of a hydrogen-containing compound such as a metal hydride as a reducing agent makes it possible to efficiently obtain B2 type and $L1_2$ type alloys by causing hydrogen to act on the metals during and after synthesis.

In this manufacturing method, water can be used as the solvent and alloy nanoparticles can be produced by a rapid operation at relatively low temperature. This method permits the preparation of B2 type and $L1_2$ type CuPd alloy nanoparticles in the form of ordered alloy nanoparticles in which the constituent Cu and Pd atoms are disposed in alternating fashion or at intervals of one atom of one kind per several atoms of the other.

When preparing the CuPd alloy nanoparticles with a bcc type crystal structure of (2), a reducing agent in the form of an inorganic hydride with strong reducing power is employed. The reduction rate can be accelerated by admixing an alcohol such as 2-ethoxyethanol and numerous metal nuclei can be produced to control the growth of particles and obtain particles with a diameter of 3 nm or less. Small diameter particles tend to produce disordered bcc type particles. The molar ratio of Cu ions and Pd ions in the dispersion or solution is set to from 0.7:0.3 to 0.3:0.7 and a reduction temperature of less than 50° C. is employed. When reduction is conducted under these conditions, it is possible to prepare CuPd alloy nanoparticles with a crystal structure of the bcc type denoted by $Cu_xPd_{(1-x)}$ (where $0.3<x<0.7$). Alloys of the bcc type have a tendency not to form at either excessively high and low reduction temperatures. Thus, the reduction temperature is set to from 0 to less than 50° C., desirably 5 to 35° C., and preferably, 10 to 30° C. The lower limit of the reduction temperature is, for example, 0° C.

To prepare the CuPd alloy nanoparticles with a crystal structure of the fcc type of (3), an inorganic hydride of strong reducing power is employed as the reducing agent. The molar ratio of the Cu ions and Pd ions in the dispersion or solution is set to a range of from 0.01:0.99 to 0.99:0.01 and a reduction temperature of less than 10° C. is employed. By conducting reduction under these conditions, it is possible to prepare CuPd alloy nanoparticles with a crystal structure of the fcc type denoted by $Cu_xPd_{(1-x)}$ (with $0.01<x<0.99$). Alloys of the fcc type tend not to form at high reduction temperatures. Thus, the reduction temperature is set to less than 10° C., desirably 5° C. or less, and preferably, 0° C. or less. The lower limit of the reduction temperature is –10° C., for example.

CuPd metal nanoparticles of, for example, mixed fcc type and B2 type can be prepared as the crystal structure of (5) by adjusting the molar ratio of Cu ions and Pd ions to the conditions under which the B2 type is produced, and employing a reduction temperature that generates CuPd alloy nanoparticles of mixed fcc type and B2 type, such as a range of 5 to 20° C. Alternatively, fcc type CuPd alloy nanoparticles prepared at a Cu ion and Pd ion molar ratio producing the B2 type can be subjected to the hydrogen atmosphere exposure treatment described further below to obtain CuPd alloy nanoparticles with a mixed fcc type and B2 type crystal structure.

CuPd metal nanoparticles of, for example, mixed bcc type and B2 type can be prepared as the crystal structure of (5) by adjusting the molar ratio of Cu ions and Pd ions to the conditions under which the B2 type is produced, and employing a reduction temperature that generates CuPd alloy nanoparticles of mixed bcc type and B2 type, such as a range of 5 to 20° C. Alternatively, bcc type CuPd alloy nanoparticles prepared at a Cu ion and Pd ion molar ratio producing the B2 type can be subjected to the hydrogen atmosphere exposure treatment described further below to obtain CuPd alloy nanoparticles with a mixed bcc type and B2 type crystal structure.

It is also possible to prepare CuPd alloy nanoparticles of mixed fcc type and $L1_2$ type as the crystal structure of (5). These CuPd alloy nanoparticles can be prepared by adjusting the molar ratio of Cu ions and Pd ions to the conditions for forming the $L1_2$ type, and employing a reduction temperature that generates CuPd alloy nanoparticles of mixed fcc type and $L1_2$ type, such as a range of 5 to 20° C. Similarly, it is possible to obtain CuPd alloy nanoparticles of mixed fcc type and $L1_2$ type crystal structure by taking fcc type CuPd alloy nanoparticles prepared at a molar ratio of Cu ions and Pd ions producing the $L1_2$ type and subjecting them to the hydrogen atmosphere exposure treatment described further below.

It is also possible to prepare CuPd alloy nanoparticles of mixed bcc type and $L1_2$ type as the crystal structure of (5). These CuPd alloy nanoparticles can be prepared by adjusting the molar ratio of Cu ions and Pd ions to the conditions for forming the $L1_2$ type, and employing a reduction temperature that generates CuPd alloy nanoparticles of mixed bcc type and $L1_2$ type, such as a range of 5 to 20° C. Similarly, it is possible to obtain CuPd alloy nanoparticles of mixed bcc type and $L1_2$ type crystal structure by taking bcc type CuPd alloy nanoparticles prepared at a molar ratio of Cu ions and Pd ions producing the $L1_2$ type and subjecting them to the hydrogen atmosphere exposure treatment described further below.

Phase separation type alloys can be mixed into the CuPd alloy nanoparticles of mixed fcc type and B2 type, CuPd alloy nanoparticles of mixed bcc type and B2 type, CuPd alloy nanoparticles of mixed fcc type and $L1_2$ type, and CuPd alloy nanoparticles of mixed bcc type and $L1_2$ type of (5) above in the manner set forth below. Following preparation under conditions producing the B2 type, bcc type, fcc type, or $L1_2$ type, it suffices to introduce a reducing agent containing 400-fold or more of hydrogen, conduct long-term preparation of one hour or more, or to raise the temperature to 70° C. or higher, for example, following about 10 minutes of the reduction reaction.

(The Hydrogen Atmosphere Exposure Treatment)

It is also possible to prepare CuPd alloy nanoparticles with a B2 type or $L1_2$ type crystal structure by the above method and to expose the CuPd alloy nanoparticles thus manufactured to a hydrogen atmosphere to obtain CuPd alloy nanoparticles with a crystal structure of enhanced order and thus produce CuPd alloy nanoparticles with a crystal structure of enhanced order.

CuPd alloy nanoparticles of B2 type or $L1_2$ type crystal structure that have been produced by the above method will have a degree of order as denoted by equation (A) of less than 99%. By contrast, exposure to a hydrogen atmosphere yields CuPd alloy nanoparticles of B2 type or $L1_2$ type with a crystal structure of enhanced order, such that the degree of order denoted by equation (A) below is 99 or greater.

$$(1-(m-M)/M) \times 100\% \qquad (A)$$

m: The lattice constant of the CuPd alloy nanoparticles
M: The lattice constant of bulk in which Cu atoms and Pd atoms are orderly disposed.

The solvent in the form of water and the like can be removed (such as by drying) from the mixture of CuPd alloy nanoparticles and protective polymer obtained by the above method, and the hydrogen atmosphere exposure treatment can be conducted at prescribed temperature and hydrogen pressure. For example, the temperature can range from 0 to 200° C., and the hydrogen pressure can range form 1 Pa to 10 MPa. The conditions of the hydrogen atmosphere exposure treatment are desirably a range of 50 to 150° C. and a hydrogen pressure of 1 MPa to 5 MPa. The treatment time can be suitably set based on the temperature and pressure. For example, it can range from 1 to 10 hours. However, the treatment time is not limited to this range.

By subjecting CuPd alloy nanoparticles of B2 type or $L1_2$ type crystal structure with a degree of order of less than 99% that have been produced by the above method to a hydrogen atmosphere exposure treatment, it is possible to obtain CuPd alloy nanoparticles of B2 type or $L1_2$ type with a crystal structure of enhanced order in the form of a degree of order of 95% or greater, desirably 99.5% or greater, and more preferably, 100%. In particular, an advantage is afforded in that when employing a hydrogen-containing compound as the reducing agent, hydrogen atoms enter into the voids between the metal atoms in the reducing process, facilitating enhancement of the degree of order by the hydrogen atmosphere exposure treatment.

The composition ratio of the CuPd alloy nanoparticles, protective polymer, and solvent in the composition obtained by the above method is as follows. For example, the concentration of the CuPd alloy nanoparticles is 1 to 99 mass %, desirably falling within a range of 20 to 99 mass %, and the concentration of the protective polymer is 1 to 99 mass %, desirably falling within a range of 1 to 10 mass %. They are selected so that the total of the CuPd alloy nanoparticles, protective polymer, and solvent is 100 mass %. These ranges are not limitations.

[The Photocatalyst Composition]

The photocatalyst composition of the present invention is one in which the above CuPd alloy nanoparticles are loaded on a support. The support is a photocatalyst that is capable of photoreducing protons to hydrogen. The photocatalyst composition of the present invention is employed to photoreduce at least one member selected from the group consisting of nitrogen oxides and nitrogen in the presence of water to produce ammonia. Thus, a photocatalyst that is capable of photoreducing protons to hydrogen is employed as the support. The photocatalyst that is capable of photoreducing protons to hydrogen can be suitably selected from among compounds of a metal element exhibiting a specific crystal structure with oxygen, nitrogen, sulfur, or fluorine. Examples of the metal element are: Ti, Zr, Hf, V, Nb, Ta, Cr, Mo, Mn, Tc, Re, Fe, Co, Ni, Ru, Rh, Pd, Os, Ir, Pt, Cu, Ag, Au, Zn, Cd, Ga, In Tl, Ge, Sn, Pb, Bi, La, and Ce. Examples of the compounds are oxides, nitrides, sulfides, oxynitrides, oxysulfides, fluorides, nitrofluorides, oxyfluorides, oxynitrofluorides, and selenides of one or more of these metals.

The photocatalyst that is capable of photoreducing protons to hydrogen is suitably selected from among semiconductors having a band gap of 1.23 V or more. Examples of semiconductors having band gaps of 1.23 V or more are metal oxides (such as $TiO_2$, $SrTiO_3$, TaON, ZnO, NiO, and $Cu_2O$), metal sulfides (such as ZnS, CdS, and HgS), metal selenides (such as CdSe), and derivatives thereof. Here, the term "derivatives" refers to the above compounds into which elements other than the above structural elements have been incorporated as impurities or as semiconductor structural elements. However, the photocatalyst that is capable of photoreducing protons to hydrogen is not limited to these semiconductors. The photocatalyst can be used singly or in combinations of two or more.

The photocatalyst support can assume various forms in the same manner as the usual catalyst supports. It can be a powder, granular, grains, a molded member (such as a honeycomb structure), or the like. However, from the perspective of efficient activation by irradiation with light, it is desirably a powder, granular, or in the form of grains. The particle diameter suitably falls within a range of 0.01 to 10 μm.

The quantity of CuPd alloy nanoparticles that are loaded onto the photocatalyst support is not specifically limited. For example, a range of 0.1 to 50 mass % is possible. Taking catalytic activity and performance into account, a range of 0.1 to 10 mass % is desirable. However, a load quantity falling outside this range can be selected based on the type of catalytic reaction and conditions employed.

In the photocatalyst composition of the present invention, the composition (containing a protective polymer and solvent) containing CuPd alloy nanoparticles prepared by the method set forth above can be loaded onto the support by the usual methods (such as impregnation). After loading, it can be dried and subjected to an activation treatment (such as a hydrogen atmosphere exposure treatment) as needed. The photocatalyst composition of the present invention exhibits a higher ammonia producing capability when irradiated with light than the conventional catalysts prepared by immersing a support in a solution of Cu salt and Pd salt.

[The Photocatalytic Reaction]

The photocatalyst composition of the present invention is employed to photoreduce at least one member selected from the group consisting of nitrogen oxides and nitrogen in the presence of water.

The photocatalytic reaction is conducted by mixing or contacting the photocatalyst composition of the present invention with water containing at least one member selected from the group consisting of nitrogen and nitrogen oxides, and irradiating the mixture with UV radiation, visible light, or both. The irradiation wavelength can be suitably determined based on the type of semiconductor (photocatalyst) employed. It need only be a wavelength range adequately containing light corresponding to the band gap energy of the semiconductor (photocatalyst).

The CuPd alloy nanoparticles employed in the photocatalyst composition of the present invention have particularly high affinity for nitrogen oxides and are particularly suited to reducing nitrogen oxides. However, they also exhibit activity in producing ammonia from nitrogen. The example of a photocatalytic reaction in the form of a reaction generating ammonia from nitrate ions will be given. A nitrate ion-containing aqueous solution is prepared for use in the reaction. The concentration of nitrate ions can be suitably determined taking into account the acid resistance and the like of the photocatalyst composition of the present invention. However, as an example, it is set to within a range of 0.00001 to 1 mass %. It is not necessary to add a reducing agent to reduce the nitrate ions to the nitrate ion-containing aqueous solution. Accordingly, the reaction is conducted without adding a nitrate ion reducing agent in the form of hydrogen gas to the reaction system from outside the reaction system.

In photodecomposition by a common photocatalyst, two reactions occur in the form of the oxidation and reduction of water. More specifically, oxygen is produced by the oxidation of hydroxyl ions and hydrogen is produced by the reduction of hydrogen ions (protons). In the production of ammonia from nitrate ions in the present invention, the highly reactive nascent hydrogen that is produced by the photocatalyst composition in water under light irradiation is used to reduce nitrate ions and produce ammonia. This reduction reaction is the reduction of water as the half reaction of the oxidation-reduction of water. In the embodiments set forth further below, to observe just ammonia synthesis as the half reaction of the oxidation-reduction of water, methanol oxidation, with its extremely-rapid reaction rate, is employed to exclude the element of the water oxidation portion. In the actual generation of ammonia from nitrate ions, a photocatalyst of high water oxidation capacity can be employed, or an adjuvant catalyst can be employed to generate ammonia without the mediation of methanol. An example of an adjuvant catalyst is indium oxide.

The photocatalyst composition of the present invention can be a photocatalyst composition in which the CuPd alloy nanoparticles of (1) are loaded onto a photocatalyst that is capable of photoreducing protons to hydrogen; a mixture of photocatalysts in which the CuPd alloy nanoparticles of (2) or (3) are loaded onto a photocatalyst capable of photoreducing protons to hydrogen; or a photocatalyst composition in which the CuPd alloy nanoparticles of (1) and (2) or (3) are loaded onto a photocatalyst capable of photoreducing protons to hydrogen. The photocatalyst composition is desirably a photocatalyst composition in which the CuPd alloy nanoparticles of (5), such as CuPd alloy nanoparticles of mixed fcc type and B2 type or $L1_2$ type crystal structure, are loaded onto a photocatalyst capable of photoreducing protons to hydrogen.

Due to the crystal structure and the like of the CuPd alloy nanoparticles, the adsorption property and the like vary and there is specificity with regard to the catalytic reaction. The CuPd alloy nanoparticles of (2) (bcc structure) and the CuPd alloy nanoparticles of (3) (fcc structure) have a strong effect in promoting the production of ammonia from $NO_2$. The CuPd alloy nanoparticles of (1) (B2 structure) work to efficiently promote the reduction of $NO_3^-$ to $NO_2^-$. Thus, portions of both structures are desirably present within the same alloy nanoparticle. However, they can also be present on separate nanoparticles.

[The Method for Producing Ammonia]

The method for producing ammonia of the present invention comprises reducing at least one member selected from the group consisting of nitrogen and nitrogen oxides in water in the presence of a photocatalyst composition in which at least one type of CuPd alloy nanoparticle among (1) to (5) above is supported on a photocatalyst capable of photoreducing protons to hydrogen with irradiation of the photocatalyst composition with light capable of activating the photocatalyst contained in the photocatalyst composition to produce ammonia.

The photocatalyst composition and the light that is capable of activating the photocatalyst contained in the photocatalyst composition are as set forth above. The method of producing ammonia by reducing in water at least one member selected from the group of nitrogen and nitrogen oxides can be conducted by placing the photocatalyst composition of the present invention in a solution obtained by dissolving or dispersing at least one member selected from the group consisting of nitrogen and nitrogen oxides in water, and irradiating it with light containing a wavelength region corresponding to the band gap energy of the photocatalyst (semiconductor). The reaction temperature, duration, and the like can be suitably selected by taking into account the reaction rate, productivity, and the like. The reduction reaction is conducted without adding hydrogen gas from outside the reaction system to the reaction system.

[The Method for Reducing Nitrogen Oxides in Water]

The method for reducing nitrogen oxides in water of the present invention comprises reducing nitrogen oxides to produce ammonia in water containing at least one type of nitrogen oxides in the presence of a photocatalyst composition in which at least one type of CuPd alloy nanoparticle among (1) to (5) above is supported on a photocatalyst capable of photoreducing protons to hydrogen with irradiation of the photocatalyst composition with light capable of activating the photocatalyst contained in the photocatalyst composition. The ammonia-containing water obtained by this method can be re-used as fertilizer.

The photocatalyst composition and the light that is capable of activating the photocatalyst contained in the photocatalyst composition are as set forth above. The method of reducing the nitrogen oxide in water containing at least one type of nitrogen oxides and removing it as ammonia can be carried out as follows. The photocatalyst composition of the present invention is placed in an aqueous solution containing at least one type of nitrogen oxides, or as a specific example, nitrate ions, and irradiated with light containing a wavelength region corresponding to the band gap energy of the photocatalyst (semiconductor). The reaction temperature, duration, and the like can be suitably selected by taking into account the nitrate ions, the nitrate ion rate being targeted, and the like. The reduction reaction is conducted without adding hydrogen gas from outside the reaction system to the reaction system.

EMBODIMENTS

The present invention will be described in greater detail below through embodiments.

Embodiment 1

(1) Preparation of the Catalyst (Preparation of CuPd Alloy Nanoparticles)

Preparation of Disordered Fcc Type CuPd Alloy Nanoparticles $7.5 \times 10^{-4}$ mol of copper acetate was dissolved in 100 mL of ion-exchange water and $7.5 \times 10^4$ mol of palladium acetate was dissolved in 50 mL of acetone. These solutions and $1.5 \times 10^{-1}$ mol of poly[N-vinyl-2-pyrrolidone] (NW=48,000) were mixed and ion-exchange water was added to prepare 300 mL of solution. The solution was cooled to 0° C. When $7.5 \times 10^{-3}$ mol of $NaBH_4$ dissolved in 100 mL of ion-exchange water was added at once, a blackish brown colloidal solution was obtained. Stirring was conducted for 30 minutes, followed by three repeat cycles of reprecipitation using acetone, water, and diethyl ether. The solvent and by-product inorganic compounds were removed, yielding disordered fcc type CuPd alloy nanoparticles (fcc-CuPd) (average particle diameter=4.5±1.7 nm).

Preparation of Ordered B2 Type CuPd Alloy Nanoparticles $7.5 \times 10^{-4}$ mol of copper acetate was dissolved in 100 mL of ion-exchange water and $7.5 \times 10^{-4}$ mol of palladium acetate was dissolved in 50 mL of acetone. These solutions and $1.5 \times 10^{-1}$ mol of poly[N-vinyl-2-pyrrolidone] (NW=48,000) were mixed and ion-exchange water was added to prepare 300 mL of solution. The solution was heated to 30° C. When $7.5 \times 10^{-3}$ mol of $NaBH_4$ dissolved in 100 mL of ion-exchange water was added at once, a blackish brown colloidal solution was obtained. Stirring was conducted for 50 minutes, followed by three repeat cycles of reprecipitation using acetone, water, and diethyl ether. The solvent and by-product inorganic compounds were removed, yielding disordered B2 type CuPd alloy nanoparticles (B2-CuPd) (average particle diameter=5.6±1.7 nm).

(Loading the CuPd Alloy Nanoparticles onto the Photocatalyst)

To an aqueous solution of 10 to 20 mL of CuPd alloy nanoparticles (fcc-CuPd or B2-CuPd) with a total metal quantity of 10 mg dissolved in water was added 1 g of $TiO_2$ powder (Degussa, P25). Ultrasound was applied for 15 minutes. The CuPd alloy nanoparticle-loaded $TiO_2$ (fcc-CuPd—$TiO_2$ or B2-CuPd—$TiO_2$) obtained was filtered with a membrane filter.

(Hydrogen Atmosphere Exposure Treatment of Loaded Catalyst)

The CuPd alloy nanoparticle-loaded $TiO_2$ was vacuum dried and placed for six hours in 2 MPa (20 atm.) of hydrogen at 373 K (100° C.). Subsequently, the hydrogen gas was exhausted at 373 K, yielding fcc-CuPd—TiO2 af H2 (a hydrogen atmosphere exposure treated product) or B2-CuPd—TiO2 af H2 (hydrogen atmosphere exposure treated product).

(2) Synthesis of Ammonia from Nitric Acid by Light (Test 1)

A mixture of 100 mg of CuPd-loaded $TiO_2$, 250 mL of methanol aqueous solution (25 vol %), and sodium nitrate or potassium nitrate containing (the equivalent of 145 ppm of nitrate ions) in a Pyrex glass container was installed in a closed circulation system made by Makuhari Rikagaku Garasu Seisakusho. A 100 W Xe lamp was used to irradiate the Pyrex container with ultraviolet radiation and the amount of hydrogen produced was examined by gas chromatography. $N_2$ gas was measured by gas chromatography simultaneously with the hydrogen gas measurement. Three hours later, the ammonia concentration in the solution was checked with an ammonia selective electrode. The concentrations of $NO_3^-$ and $NO_2^-$ ions were measured by ion chromatography.

FIG. 1 shows the quantity of hydrogen produced in water-decomposing photoreactions employing variously loaded catalysts. The generation of hydrogen in all of the aqueous solutions was confirmed. The fcc-CuPd—TiO2 (fcc-CuPd—TiO2 af H2) that had been treated by exposure to a hydrogen environment exhibited a clearly increased amount of hydrogen generation relative to the fcc-CuPd—TiO2 that had not been treated by exposure to a hydrogen environment.

Figure 2:
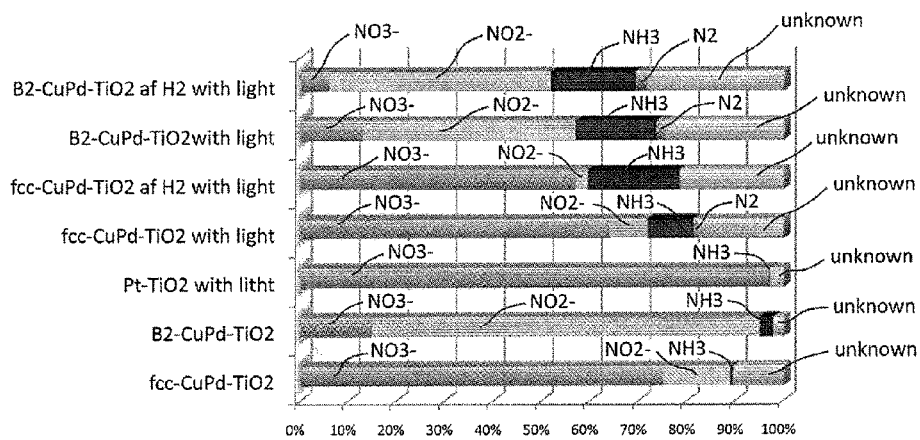
FIG. 2 shows the products and conversion rates in $NO_3$ reduction reactions with variously loaded $TiO_2$ in Embodiment 1.

FIG. 2 shows the products and conversion rates in $NO_3^-$ reduction reactions with variously loaded $TiO_2$. The cases where no light was irradiated (B2-CuPd—TiO2 and Fcc-CuPd—TiO2) exhibited extremely low levels of ammonia production. By contrast, irradiation with light produced a marked increase.

For example, the ammonia production level of the B2-CuPd-loaded catalyst (B2-CuPd—TiO2 with light) was about 17%. Compared to the results of Nonpatent Reference 2 (in aqueous solution, with hydrogen gas), despite the use of about 1/10th the quantity of metal, the rate of conversion to ammonia was about double. A simple calculation reveals a roughly 20-fold effect.

Disordered fcc-loaded catalyst exhibited a low conversion rate prior to hydrogen atmosphere exposure treatment (fcc-CuPd—TiO2 with light). However, following the hydrogen atmosphere exposure treatment (fcc-CuPd—TiO2 of H2 with light), the levels of hydrogen and ammonia production increased. The conversion rate was found to increase to 19%. Since the quantity of $NO_2^-$ produced was low, the selectivity of ammonia production had clearly been enhanced. This was attributed to an increase in the B2 type CuPd component in the fcc-CuPd—TiO2 after the hydrogen atmosphere exposure treatment, a decrease in the activation barrier of the reaction from $NO_3^-$ to $NO_2^-$, and an increase in the quantity of hydrogen produced, resulting in the smooth progression of $NH_3$ production.

As shown in FIG. 1, in the Pt—TiO2 prepared as a reference example, the quantity of hydrogen produced was large, but as also indicated in the figure, the quantity of ammonia produced was extremely small. These results indicated that it was important for CuPd with affinity for $NO_3^-$ and highly active hydrogen (generated by the photodecomposition of water) to be present in order to obtain $NH_3$ from $NO_3^-$.

(3) Synthesis of Ammonia from Nitric Acid by Light (Test 2)

A mixture of 100 mg of CuPd-loaded $TiO_2$, 250 mL of methanol aqueous solution (10 vol %), and 12 mg of potassium nitrate (the equivalent of 29 ppm of nitrate ions) containing potassium nitrate in a Pyrex glass container was installed in a closed circulation system made by Makuhari Rikagaku Garasu Seisakusho. A 100 W Xe lamp was used to irradiate the Pyrex container with ultraviolet radiation and the amount of hydrogen produced was examined by gas chromatography. $N_2$ gas was measured by gas chromatography simultaneously with the hydrogen gas measurement. Three hours later, the ammonia concentration in the solution was checked with an ammonia selective electrode. The concentrations of $NO_3^-$ and $NO_2^-$ ions were measured by ion chromatography.

Figure 3:
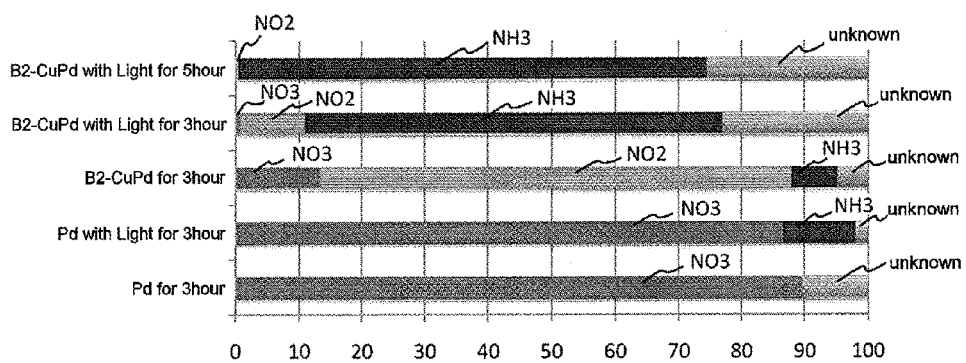
FIG. 3 shows the products and conversion rates in $NO_3$ reduction reactions with a B2-CuPd loaded catalyst in Embodiment 1.
Figure 4:
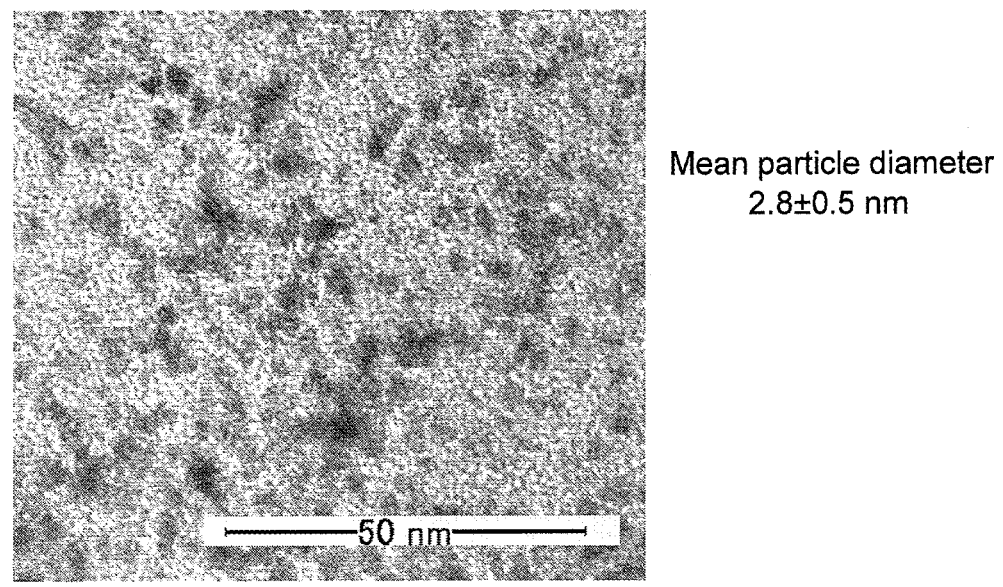
FIG. 4 shows the TEM image and particle size distribution of CuPd nanoparticles (CuxPd(1-x), x=0.10) prepared in (1) of Embodiment 2.
Figure 4:
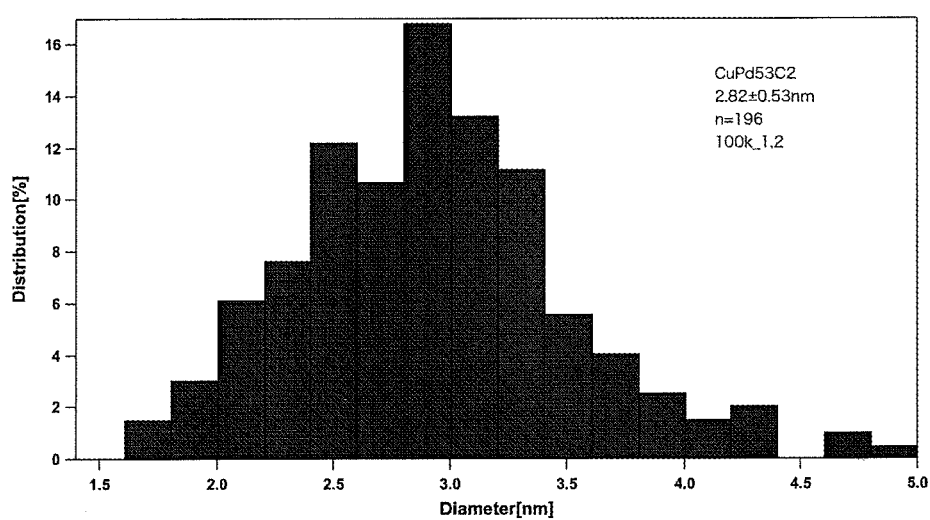
Figure 5:
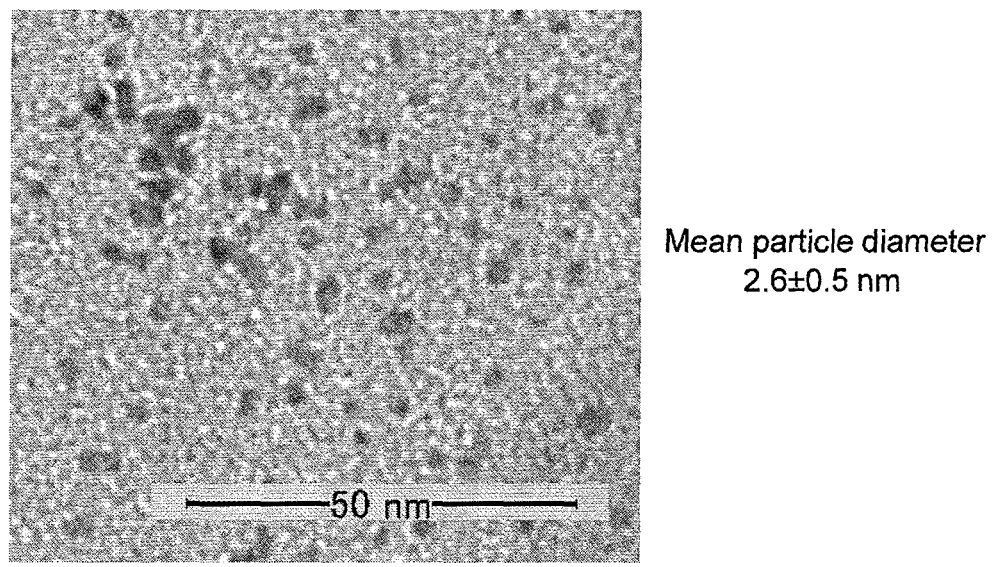
FIG. 5 shows the TEM image and particle size distribution of CuPd nanoparticles (CuxPd(1-x), x=0.20) prepared in (1) of Embodiment 2.
Figure 5:
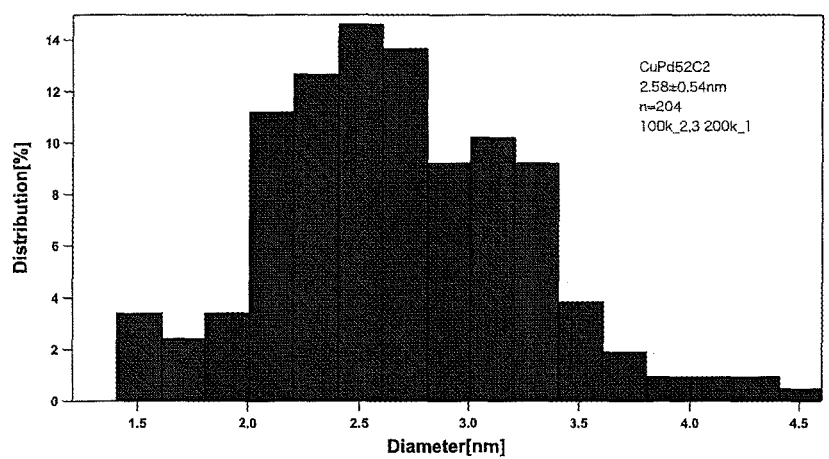
Figure 6:
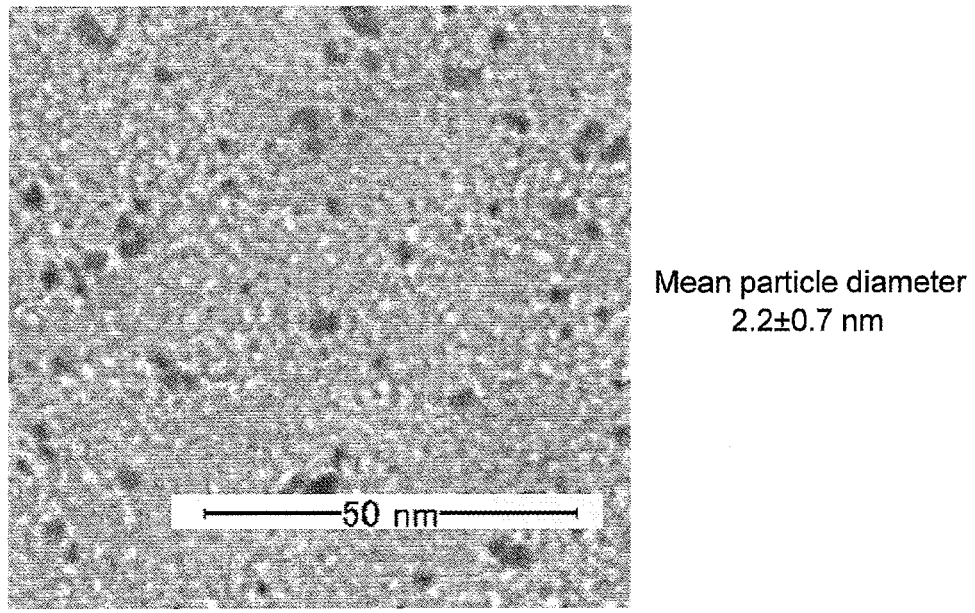
FIG. 6 shows the TEM image and particle size distribution of CuPd nanoparticles (CuxPd(1-x), x=0.51) prepared in (1) of Embodiment 2.
Figure 6:
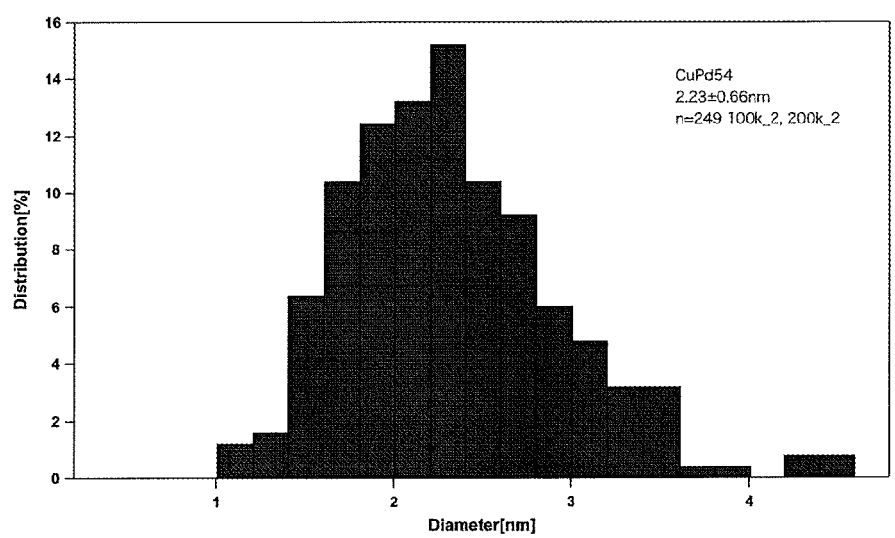
Figure 7:
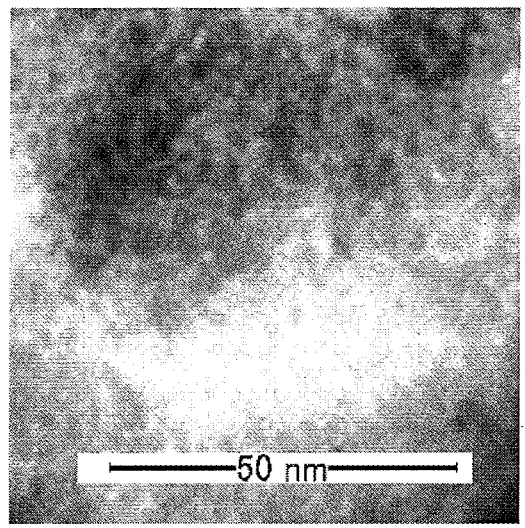
FIG. 7 shows the TEM image and particle size distribution of CuPd nanoparticles (CuxPd(1-x), x=0.59) prepared in (1) of Embodiment 2.
Figure 7:
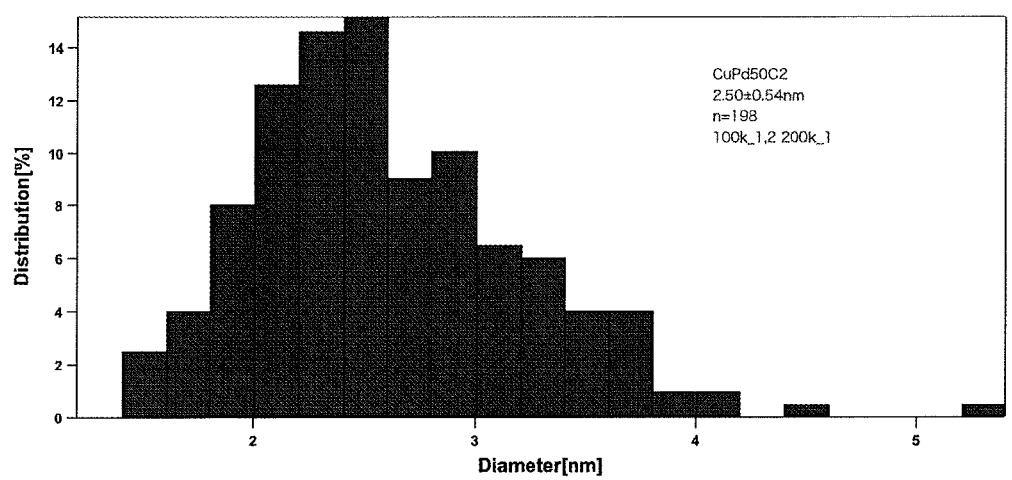

FIG. 3 shows the products and conversion rates in $NO_3^-$ reduction reactions with a B2-CuPd loaded catalyst. Without light irradiation, the quantity of ammonia produced was extremely small. By contrast, with light, the quantity of ammonia produced during irradiation increased.

The Pd—$TiO_2$ shown in FIG. 3 for comparison essentially produced no ammonia when not irradiated with light. With light, it produced ammonia. However, compared to the B2-CuPd-loaded catalyst, the quantity of ammonia produced was markedly smaller.

The results obtained in 1 and 2 above when potassium nitrate was employed in the above tests with the use of B2-CuPd-loaded catalyst are organized in Table 1 below.

(a) and (b) show the amount of decrease ($[NO_3^-]_{int}-[NO_3^-]$) in nitrate ions in the reaction solution, and the concentrations of nitrite ions ($[NO_2^-]$) and ammonia ($[NH_3]$) in the reaction solution under hydrogen pressure (dark) and with UV irradiation (UV). The initial nitric acid concentrations were: (a) Test 2: 29 ppm; (b) Test 1: 145 ppm. (c) gives the values obtained by dividing the values under UV conditions by the values under dark conditions for the various concentrations. As shown in Table 1, the ammonia producing capacity with UV irradiation (UV) was found to be about 10-fold that under hydrogen pressure (dark).

TABLE 1

| | $[NO_3^-]_{int}-[NO_3^-]$/mM | $[NO_2^-]$/mM | $[NH_3]$/mM |
|---|---|---|---|
| (a) (Test 2) | | | |
| dark | 408 | 350 | 35 |
| UV | 467 | 48 | 311 |
| (b) (Test 1) | | | |
| dark | 1638 | 1367 | 71 |
| UV | 2216 | 1201 | 618 |
| (c) | | | |
| $[NO_3^-]_{initial}$ | $NO_3^-$ | $NO_2^-$ | $NH_3$ |
| 29 ppm | 1.1 | 0.1 | 8.9 |
| 145 ppm | 1.4 | 0.9 | 8.7 |

Embodiment 2

(1) Method of Preparing Small Diameter $Cu_xPd_{(1-x)}$ Nanoparticles (0<x<0.8) $Cu_xPd_{(1-x)}$ nanoparticles were prepared by changing the concentration ratio of Cu and Pd contained in the copper acetate and palladium acetate of the starting materials employed in synthesis.

The method of preparing $Cu_{0.5}Pd_{0.5}$ nanoparticles is indicated below.

In a glass tube, 0.3 g of copper acetate ($1.5 \times 10^{-3}$ mol) and 1.666 g of polyvinylpyrrolidone K30 ($1.5 \times 10^{-2}$ mol) were admixed with 10 mL of 2-ethoxyethanol. The mixture was dissolved by keeping for one hour at 1,300 rpm and 50° C. The dissolved solution was cooled to 30° C. In a separate glass container, 0.337 g of palladium acetate was dissolved in 15 mL of acetone. The palladium acetate solution was added to the copper acetate solution. A 0.227 g quantity of $NaBH_4$ ($6.0 \times 10^{-3}$ mol) dissolved in 1.5 mL of Millipore water was added to the mixed solution of palladium acetate and copper acetate and the mixture was reacted for one hour with stirring at a speed of 1,300 rpm at 30° C. Immediately following the addition of the $NaBH_4$ aqueous solution, the reaction solution assumed a blackish brown color. The reaction solution obtained was divided in two, and 5 mL of water and acetone were added to each to make a total of 45 mL. These mixtures were centrifugally separated at 3,500 rpm. The liquids of the supernatants containing the excess polyvinylpyrrolidone and inorganic salts were discarded, and CuPd nanoparticles were obtained as precipitates. They were similarly washed four times and repeatedly reprecipitated 3 to 5 times from a mixed solvent containing 5 mL of ethanol 25 mL of acetone and diethyl ether, yielding CuPd nanoparticles.

Based on ICP emission analysis (ICPE-9000) of the nanoparticles prepared, x=0.10, 0.20, 0.51, and 0.59 nanoparticles were obtained.

TEM Image (JEM 2000, Acceleration Voltage 200 kV) of the CuPd Nanoparticles Prepared TEM observation revealed that the average particle diameters of the $Cu_xPd_{(1-x)}$ (x=0.10, 0.20, 0.51, or 0.59) nanoparticles prepared using a mixed solvent of water and 2-ethanol were about 2.5 nm in all of the samples, which was smaller than the particle diameter achieved when water alone was employed as solvent (Embodiment 1). The individual particles were also found to be highly dispersible. The results are given in FIGS. 4 to 7.

Figure 8:
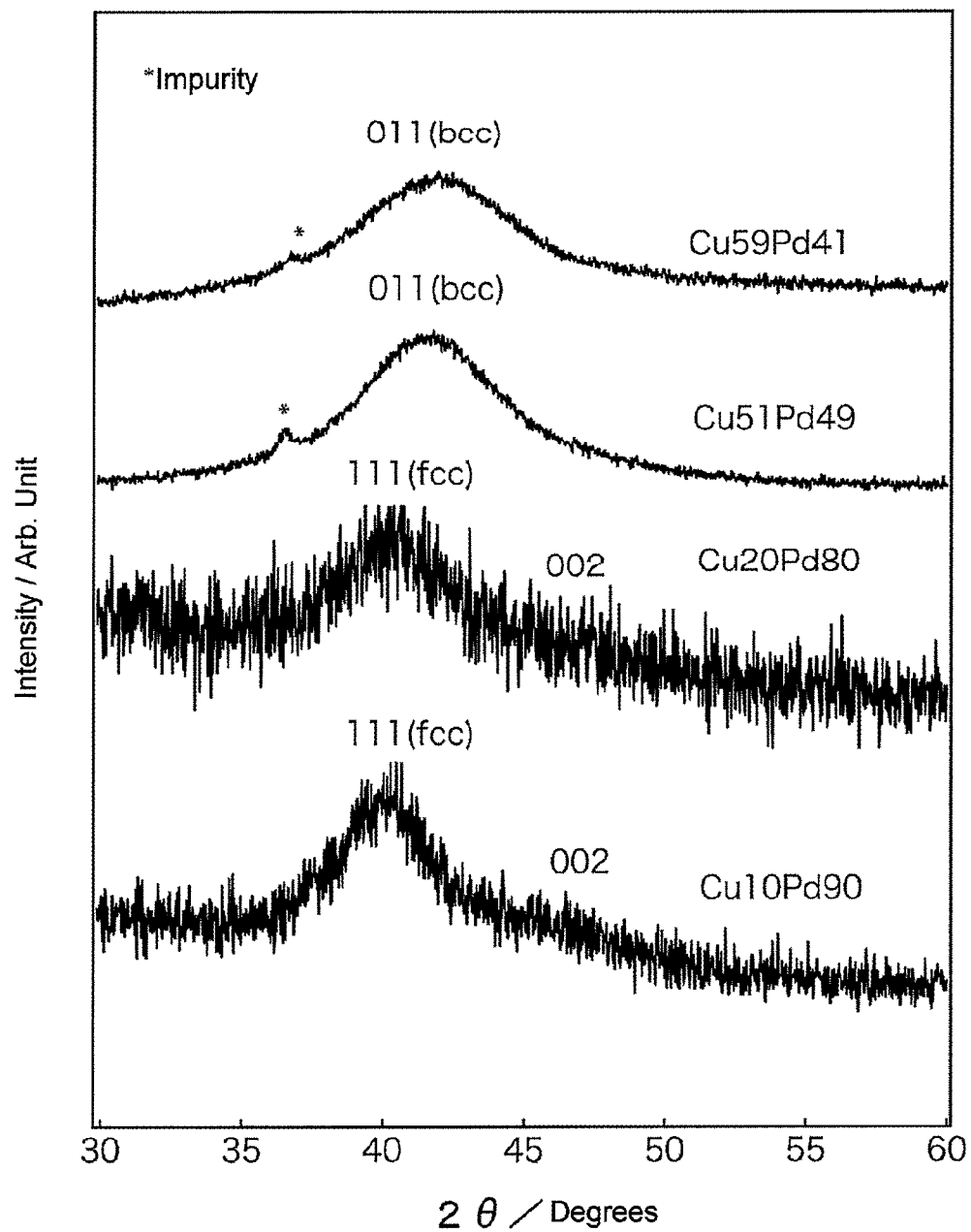
FIG. 8 shows the powder XRD pattern of CuPd nanoparticles prepared in (1) of Embodiment 2.

FIG. 8 shows the powder XRD pattern of the CuPd nanoparticles prepared (D8 Advance made by Bruker, CuKa).

Since all of the samples exhibited diffraction from a single structure, they were found to have assumed alloy structures in which component metals were mixed in single particles. $Cu_{0.1}Pd_{0.90}$ and $Cu_{0.2}Pd_{0.8}$, which had high Pd concentrations, assumed disordered fcc structures. $Cu_{0.51}Pd_{0.49}$ was found to assume a B2 or disordered bcc type structure. The pattern of $Cu_{0.59}Pd_{0.41}$ nanoparticles was unclear, so no detailed structure could be determined.

(2) Method of Preparing $TiO_2$ Support Catalyst Containing 0.12 mmol (1 wt % in the Case of $Cu_{0.5}Pd_{0.5}$) of the Alloy Nanoparticles Prepared in (1)

Figure 9:
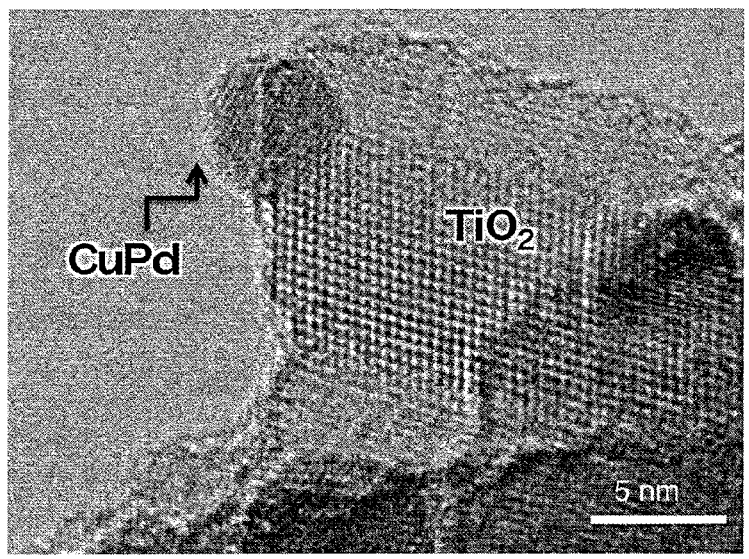
FIG. 9 shows the TEM image of the catalyst comprising 0.12 mmol of alloy nanoparticles (Cu0.5Pd0.5, 1 wt %) loaded on $TiO_2$ prepared in (2) of Embodiment 2.

To an aqueous solution of 10 to 20 mL of CuPd alloy nanoparticles with a total metal quantity of 0.12 dissolved in water was added 1 g of $TiO_2$ powder (p25). Ultrasound was applied for 15 minutes. The CuPd alloy nanoparticle-loaded $TiO_2$ obtained (fcc-CuPd—$TiO_2$ or B2-CuPd—$TiO_2$) was filtered with a membrane filter. TEM observation (FIG. 9) of the loaded catalyst obtained revealed that the nanoalloy had been loaded onto the $TiO_2$.

Nitric Acid-Reducing and Ammonia-Producing Reaction Employing Nascent Hydrogen from Water Photoreduction A mixture of 100 mg of CuPd-loaded $TiO_2$, 250 mL of methanol aqueous solution (10 vol %), and 20.4 mg of sodium nitrate (the equivalent of 50 ppm of nitrate ions) containing potassium nitrate in a Pyrex glass container was installed in a closed circulation system made by Makuhari Rikagaku Garasu Seisakusho. A 100 W Xe lamp was used to irradiate the Pyrex container with ultraviolet radiation and the amount of hydrogen produced was examined by gas chromatography. $N_2$ gas was measured by gas chromatography simultaneously with the hydrogen gas measurement. Three hours later, the ammonia concentration in the solution was checked with an ammonia selective electrode. The concentrations of $NO_3^-$ and $NO_2^-$ ions were measured by ion chromatography. The results are given in FIG. 10.

Figure 10:
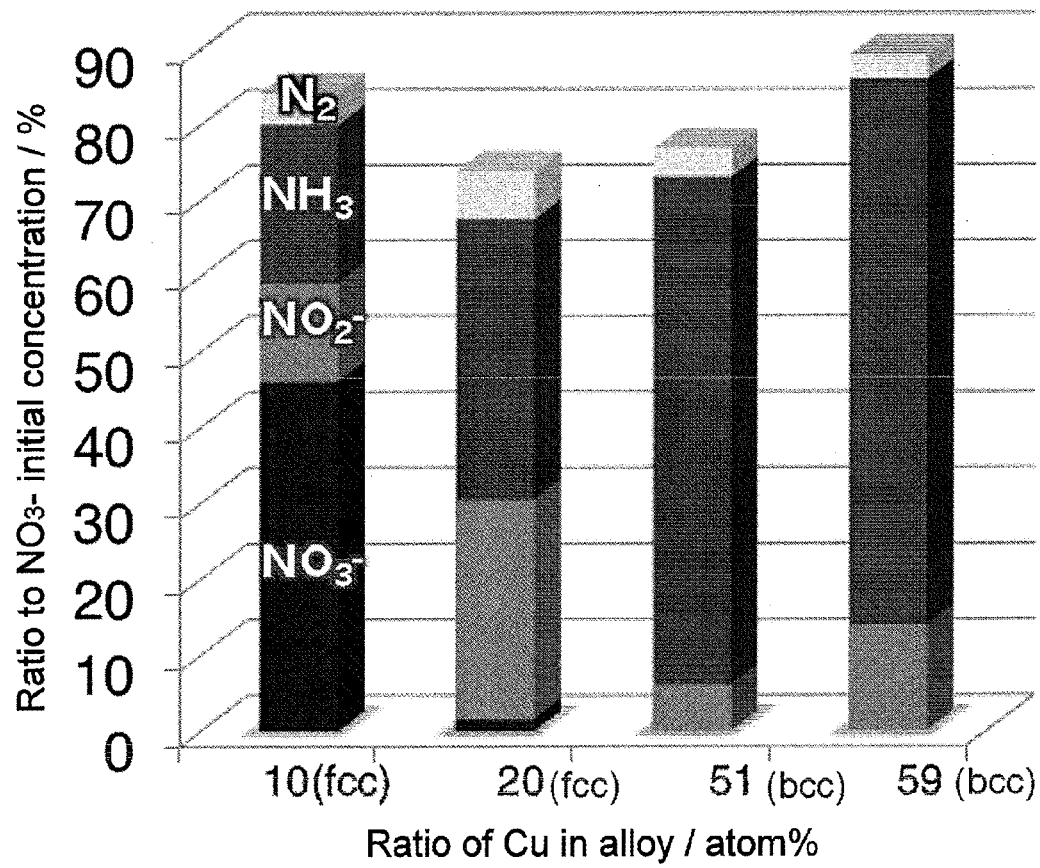
FIG. 10 shows the products and their conversion rates for $NO_3$ reduction reactions employing variously loaded catalysts in Embodiment 2.

As shown in FIG. 10, the loaded solvent prepared exhibited high ammonia selectivity despite the use of a nitric acid concentration in the reaction of 1.7 times that previously employed. When the proportion of Cu in the alloy was 51 atomic %, the ammonia production selectivity clearly assumed a peak value of 67%. That indicated that an alloy nanoparticle in which Cu and Pd were well mixed at the atomic level was advantageous for ammonia production.

INDUSTRIAL APPLICABILITY

The present invention is useful in the field of ammonia manufacturing and in the field of water treatment.

The invention claimed is:

1. A method for producing ammonia, comprising reducing at least one member selected from the group consisting of nitrogen and nitrogen oxides in water in the presence of a photocatalyst composition in which CuPd alloy nanoparticles are supported on a photocatalyst capable of photoreducing protons to hydrogen with irradiation of the photocatalyst composition with light capable of activating the photocatalyst contained in the photocatalyst composition to produce ammonia, wherein the CuPd alloy nanoparticles have an average particle diameter of 1 to 7 nm, and the CuPd alloy nanoparticles are at least one type of CuPd alloy nanoparticle from among (1), (2) and (3): (1) CuPd alloy nanoparticles having a B2 type crystal structure and denoted by $Cu_xPd_{(1-x)}$ (wherein $0.3 \leq x \leq 0.7$); (2) CuPd alloy nanoparticles having a bcc type crystal structure and denoted by $Cu_xPd_{(1-x)}$ (wherein 0.3<x<0.7); and (3) CuPd alloy nanoparticles having an L12 type crystal structure and denoted by $Cu_xPd_{(1-x)}$ (wherein $0.7 \leq x \leq 0.98$).

2. The production method according to claim 1, wherein the CuPd alloy nanoparticles is (1) CuPd alloy nanoparticles having a B2 type crystal structure and denoted by $Cu_xPd_{(1-x)}$ (wherein 0.3<x<0.7).

3. The production method according to claim 1, wherein the CuPd alloy nanoparticles is (2) CuPd alloy nanoparticles having a bcc type crystal structure and denoted by $Cu_xPd_{(1-x)}$ (wherein 0.3<x<0.7).

4. The production method according to claim 1, wherein the CuPd alloy nanoparticles is (4) CuPd alloy nanoparticles having an $L1_2$ type crystal structure and denoted by $Cu_xPd_{(1-x)}$ (wherein $0.7 \leq x \leq 0.98$).

* * * * *